United States Patent Office 3,804,932
Patented Apr. 16, 1974

3,804,932
PROCESS FOR PREPARING SEMIPERMEABLE MEMBRANES
Kiyoshi Ishii, Katumi Kojima, and Kazuo Ishikawa, Saitama, Japan, assignors to Daicel Ltd., Osaka, Japan
No Drawing. Filed July 13, 1972, Ser. No. 271,298
Claims priority, application Japan, July 28, 1971, 46/56,540
Int. Cl. B29c 5/00
U.S. Cl. 264—49                                                             2 Claims

ABSTRACT OF THE DISCLOSURE

Semipermeable membranes for use in reverse osmosis or ultrafiltration are prepared by cast molding a cast molding solution comprising cellulose acetate, a swelling agent and a composite solvent comprising acetone as a first component and a material selected from the group consisting of 1,4-dioxane, 1,3-dioxolane, dimethyl formamide and 2-methoxyethyl acetate as a second component. The solution is cast molded at ambient temperature.

BACKGROUND OF THE INVENTION

Field of the invention

This invention relates to an improvement in the process for the preparation of cellulose ester semipermeable membranes for use in reverse osmosis or ultra-filtration. More specifically, the invention relates to a process for preparing semipermeable membranes for use in reverse osmosis or ultrafiltration in which a cast molding solution capable of being cast molded at ambient temperature (usually about 20° C.) is formed and a semipermeable membrane is prepared from said cast molding solution.

Description of the prior art

Studies on the preparation of semipermeable membranes have been made actively since S. Loeb et al. invented an important process comprising forming a cast molding solution by adding an aqueous solution of magnesium perchlorate and acetone to cellulose acetate as a membrane-forming substance, cast molding the solution at −10° C., allowing the cast solution to stand still for a certain period of time to evaporate a part of the solvent, immersing the cast product in water maintained at 0° C. to cause gelation and to convert it to a cast molded thin film, eluting the magnesium perchlorate and acetone from the thus formed thin film, and optionally subjecting the film to heat treatment according to need.

However, these studies are directed to processes similar to the process of Loeb et al. and they concentrated mainly on the search for high molecular substances, other than cellulose acetate, suitable as membrane-forming substances and on the search for novel cast molding solutions, especially solutions employing substitutes for magnesium perchlorate. These studies have not resulted in important progress over the process of Loeb et al.

In fact, although many years have passed since Loeb et al. completed their invention, substances which are more advantageous than cellulose acetate, as the membrane-forming substance, have not yet become known. Many novel processes using cellulose acetate as the membrane-forming substance have been proposed. However, most of these processes are similar to the above-mentioned membrane-forming process of Loeb et al., and they are characterized by the following common features.

(A) In general the cast molding solution is composed of the following three components, namely (1) cellulose acetate or other cellulose ester, (2) a solvent (acetone in many cases) and (3) an additive of a single substance or a composite composition which is called the "swelling agent."

(B) This cast molding solution is cast on, for instance, a glass sheet having a smooth and clean surface to obtain a thin film of the solution and it is allowed to stand still for a certain period of time to evaporate a part of the solvent.

(C) The thin film is then immersed in a liquid which is a non-solvent for cellulose acetate or cellulose ester and is capable of dissolving the solvent and the swelling agent used for making the cast molding solution (water in many cases), and the solvent and swelling agent are thereby eluted from the gelled thin film.

(D) Then, the gelled film is heat-treated, for instance, by dipping it in hot water according to need.

The individual distinguishing features of the various known processes for preparing cellulose acetate semipermeable membranes, all of which are characterized by the above common features, reside mainly in the kind and amount of the swelling agent used for making the cast molding solution.

When these similar membrane-forming processes are examined from a different viewpoint, i.e., in view of the factor of the cast molding temperature, it is possible to divide many swelling agents into the following two groups:

(a) Swelling agents which give a cast molding solution capable of being cast molded at ambient temperature (for instance, formamide, maleic acid and the like).

(b) Swelling agents which fail to give a semipermeable membrane having excellent properties unless the cast molding is performed at a temperature lower than ambient temperature (preferably lower than 0° C., especially about −10° C.) (for instance, aqueous solution of magnesium perchlorate, tartaric acid and the like).

There is no substantial difference in the properties of the resulting semipermeable membranes if the swelling agent of the former group is used or if the swelling agent of the latter group is used, provided the appropriate cast molding temperature is used. However, in practical operation, it is evident that the process in which the cast molding must be performed at a lower temperature is less advantageous than the process in which the cast molding can be carried out at ambient temperature.

The details of the mechanism by which the so-called Loeb-type semipermeable membranes are formed in these membrane-forming processes have not been elucidated. It is difficult to understand the reason why a semipermeable membrane having excellent properties cannot be obtained when a cast molding solution comprising a swelling agent of the group (b) is cast molded at ambient temperature.

However, it is considered that the following influences may affect the cast molded solution thin film as a consequence of a change in the cast molding temperature:

(1) The solution condition is changed by the change of the temperature of the solution per se.

(2) The rate of evaporation of the solvent from the surface of the film is changed and hence, the concentration and the concentration gradient in the film surface are changed.

Among the above two changes, the latter can be adjusted by changing other cast molding conditions. For instance, when a film is formed from a cast molding solution composed of 25 parts of cellulose acetate, 45 parts of acetone and 30 parts of formamide, a reduction of the desired properties of the resulting semipermeable membrane can be prevented by adjusting the evaporation time even when the cast molding temperature is varied from 10 to 30° C. Further, by increasing the partial pressure of acetone, it is possible to prolong the optimum evaporation time and to broaden the range of allowable tolerances in the amounts of the starting materials and the evaporation time. From the foregoing, it is considered that a change in the cast molding temperature within the above range does not cause any great change in the solution condition and, hence, the influences on the solution thin film by a change of the cast molding temperature can be compensated by adjusting the amount of the solvent evaporated from the film surface. However, contrary to our expectations, when the cast molding was conducted using the above solution at −10° C., even if these conditions were varied in broad ranges, it was impossible to obtain a semipermeable membrane comparable to an optimum quailty semipermeable membrane obtained by cast molding at ambient temperature. Moreover, when a cast molding solution composed of 22.2 parts of cellulose acetate, 66.7 parts of acetone and 11.1 parts of 10% aqueous solution of magnesium perchlorate was cast molded at ambient temperature, even if the evaporation time, the vapor pressure of the acetone in the atmosphere and other conditions were greatly varied, there was obtained only a semipermeable membrane which was much inferior to a semipermeable membrane obtained by conducting the cast molding at −10° C. Further, even when a high boiling point solvent was used, instead of acetone, with a view to reducing the evaporation rate of the solvent by its own inherent property, a semipermeable membrane having excellent properties could not be obtained.

As is seen from the above experimental results, in the cast molding processes using a cast molding solution comprising a swelling agent of the group (b), it has heretofore been considered that it is essential to conduct the cast molding at low temperatures in order to fabricate semipermeable membranes of excellent qualities.

SUMMARY OF THE INVENTION

Contrary to this opinion, as a result of studies on solutions containing cellulose acetate as the membrane-forming susbtance and on cast molding conditions, we have discovered that in preparing a cast molding solution containing a swelling agent of the group (b), namely a swelling agent which has been considered to give a solution which must be cast molded at low temperatures, when a composite solvent comprising acetone as one component and a specific solvent as the second component is used, instead of acetone alone, even if the solution is cast molded at ambient temperature, it is possible to obtain a semipermeable membrane having excellent qualities.

The second component to be used in this invention is selected from 1,4-dioxane, 1,3-dioxolane, dimethyl formamide and 2-methoxyethyl acetate.

According to the present invention, there is provided a process for preparing semipermeable membranes for use in reverse osmosis or ultra-filtration by casting onto a smooth surface, at ambient temperature, a thin film of a casting solution comprising cellulose acetate, a swelling agent and a composite solvent comprising acetone as a first component and a material selected from the group consisting of 1,4-dioxane, 1,3-dioxolane, dimethyl formamide and 2-methoxyethyl acetate as a second component.

The ambient temperature means a temperature in the range of about 10 to about 35° C., usually about 20° C.

Preferably, said casting solution consists essentially of:

(A) From 11 to 30% by weight of cellulose acetate,
(B) From 11 to 29% by weight of an aqueous solution of a swelling agent selected from the group consisting of magnesium perchlorate, tartaric acid, nitric acid, potassium iodide, acetic acid, t-butanol and mixtures of magnesium perchlorate, zinc bromide and zinc chloride,
(C) From 5 to 63% by weight of acetone, and
(D) From 5 to 61% by weight of a material selected from the group consisting of 1,4-dioxane, 1,3-dioxolane, dimethyl formamide and 2-methoxyethyl acetate.

As cellulose acetate, an acetone-soluble cellulos acetate having an acetyl content in the range of from 32 to 42% by weight is preferably used.

The characteristic feature of this invention resides in the use of a composite solvent comprising the above-mentioned two specific components, and such makes it possible for this invention to attain significant improvements. For instance, a semipermeable membrane obtained by cast molding at −10° C. a prior art cast molding solution composed of 21 parts of cellulose acetate, 67.5 parts of acetone and 11.5 parts of 10% aqueous solution of magnesium perchlorate and heat-treating the cast solution at 73° C. has such properties that when water containing 3500 p.p.m. sodium chloride is fed over the membrane under 40 atmospheres pressure in a reverse osmosis system, a salt removal ratio of 91% and a water permeation of 1.02 m.$^3$/m.$^2$/day are attained. However, when the above prior art cast molding solution is cast molded at ambient temperature (20° C.) using several different evaporation times in the range of from 120 seconds to 10 seconds, the optimum product exhibits only a salt removal ratio of 87% and a water permeation of 0.15 m.$^3$/m.$^2$/day. In contrast, a semipermable membrane obtained by cast molding at ambient temperature (20° C.) a cast molding solution prepared according to the present invention by employing a composite solvent composed of 45.5 parts of acetone and 22 parts of 1,4-dioxane, instead of 67.5 parts of acetone, and the other constituents being the same, has the excellent properties of a salt removal ratio of 95% and a water permeation of 1.26 m.$^3$/m.$^2$/day.

The invention will now be further described by reference to the following illustrative examples.

Examples 1–4, Comparative Examples 1–8 and Referential Examples 1–2

In preparing a series of cast molding solutions composed of 22.2 parts of cellulose acetate, 11.1 parts of 10% aqueous solution of magnesium perchlorate as the swelling agent and 66.7 parts of a solvent, there were used composite solvents composed of acetone as the first component and various other organic solvents as indicated in Table 1 as the second component. Each of the thus formed solutions was cast on a glass sheet having a clean and smooth surface at ambient temperature (20±1° C.) in a thickness of 250μ to form a thin film of the solution. The resulting thin film was allowed to stand still for a period of evaporation time as indicated in Table 1 to evaporate a part of the solvent and then the film was immersed in water maintained at 0–1° C. for about 1 hour to elute out the solvent and swelling agent. Then, the thin film was immersed in hot water maintained at the heat treatment temperature indicated in Table 1 for 14 minutes to accomplish the heat treatment.

From the resulting semipermeable membranes were cut circular specimens having a diameter of 75 mm. The salt-removing capacity was measured by employing a device equivalent to the device disclosed in Japanese patent publication No. 20,483/70. The measurement was conducted by feeding water containing sodium chloride at a concentration of 3500 p.p.m. under a pressure of 42 kg./cm.$^2$ gauge at a feed rate of 40 l./hr. and sampling the permeated water after 30 minutes had passed from the initiation of pressurization. The results of the measurements of the salt removal capacity are shown in Table 1.

The value of the salt removal ratio given in the table are calculated from the following equation:

$$\text{Salt removal ratio} = 100 \times (Co - Cp)/Co$$

in which Co stands for the salt concentration (p.p.m.) in sodium chloride-containing feed water and Cp stands for the salt concentration (p.p.m.) in the water permeated through the membrane (purified product water).

In the referential examples, semipermeable membranes were prepared under optimum conditions of the known membrane-forming processes. They were subjected to same measurements by randomly interspersing them, in the series of tests, with the specimens obtained in above examples. The membrane-preparing processes and conditions of the referential examples and the measurement results are shown in Table 2.

From the results of the examples and comparative exbrane according to this invention gives a water permeation which is higher by 30–50% than is the case with semipermeable membranes obtained in the referential examples.

TABLE 1

| Solvent system | Evaporation time (second) | Heat treatment temperature (° C.) | Water permeation (m.³/m.²/day) | Salt removal ratio (percent) |
|---|---|---|---|---|
| Example: | | | | |
| 1. Acetone (56.7 parts), 2-methoxyethyl acetate (10 parts). | 15 | 60 | 0.75 | 92.9 |
|  | 30 | 64 | 0.74 | 96.2 |
| 2. Acetone (46.7 parts), 1,4-dioxane (20 parts). | 15 | 70 | 1.73 | 93.5 |
|  | 30 | 72 | 1.47 | 95.0 |
|  | 45 | 70 | 1.33 | 94.4 |
|  | 60 | 70 | 1.49 | 92.4 |
| 3. Acetone (56.7 parts), 1,3-dioxolane (10 parts). | 15 | 60 | 0.63 | 92.6 |
|  | 30 | 55 | 1.29 | 85.4 |
| 4. Acetone (56.7 parts), dimethyl formamide (10 parts). | 15 | 80 | 1.23 | 95.0 |
|  | 30 | 80 | 0.90 | 97.3 |
|  | 60 | 75 | 1.33 | 94.1 |
| Comparative Example: | | | | |
| 1. Acetone (46.7 parts), methylethylketone (20 parts). | 30 | 70 | 0.08 | (¹) |
|  | 60 | 70 | 0.11 | (¹) |
|  | 120 | 65 | 0.02 | (¹) |
| 2. Acetone (46.7 parts), cyclohexanone (20 parts). | 30 | (²) | 0.00 | (¹) |
|  | 60 | (²) | 0.02 | (¹) |
|  | 120 | (²) | 0.03 | (¹) |
|  | 600 | (²) | 0.01 | (¹) |
| 3. Acetone (46.7 parts), acetic acid (20 parts). | 60 | (²) | 0.56 | 37.8 |
|  | 20 | (²) | 0.86 | 37.0 |
|  | 10 | 60 | 0.41 | 85.8 |
| 4. Acetone (46.7 parts), ethyl acetate (20 parts). | 15 | (²) | 0.00 | (¹) |
|  | 60 | (²) | 0.01 | (¹) |
|  | 120 | (²) | 0.43 | 96.2 |
|  | 80 | (²) | 0.00 | (¹) |
| 5. Acetone (46.7 parts), dimethyl sulfoxide (20 parts). | 60 | (²) | 0.22 | (¹) |
|  | 600 | (²) | 0.09 | (¹) |
| 6. Acetone (46.7 parts), pyridine (20 parts). | 30 | (²) | 0.67 | 54.7 |
|  | 60 | (²) | 0.39 | 43.3 |
|  | 600 | (²) | 0.00 | (¹) |
|  | 300 | (²) | 0.14 | (¹) |
| 7. Acetone (46.7 parts), cyclohexanol (20 parts). | 30 | (²) | 0.26 | (¹) |
|  | 60 | (²) | 0.28 | 38.1 |
|  | 180 | (²) | 0.40 | 17.7 |
| 8. Acetone (46.7 parts), ethanol (20 parts). | Gelation of the solution occurred | | | |

¹ The measurement was impossible because the amount of water that permeated was too small.
² Heat treatment was not effected.

TABLE 2

| | Referential Example 1 | Referential Example 2 |
|---|---|---|
| Cellulose acetate | 22.2 parts | 25.0 parts. |
| Solvent | Acetone (66.7 parts) | Acetone (45.0 parts). Formamide (30.0 parts). |
| Swelling agent | 10% aqueous solution of magnesium perchlorate (11.1 parts). | |

| | | | | | | | | | | |
|---|---|---|---|---|---|---|---|---|---|---|
| Evaporation time (second) | 120 | 180 | 120 | 180 | 30 | 30 | 40 | 45 | 45 | 45 |
| Heat treatment temperature (° C.) | 74 | 70 | 70 | 66 | 80 | 78 | 74 | 80 | 78 | 74 |
| Water permeation (m.³/m.²/day) | 0.72 | 1.33 | 0.80 | 1.58 | 0.84 | 0.95 | 1.37 | 0.76 | 0.94 | 1.21 |
| Salt removal ratio (percent) | 94.0 | 88.3 | 90.5 | 84.5 | 97.6 | 93.9 | 90.2 | 96.8 | 94.5 | 91.2 |
| Cast molding temperature (° C.) | −10 | −10 | −10 | −10 | 20 | 20 | 20 | 20 | 20 | 20 | amples shown in Table 1 it will readily be understood that the following four solvents, namely 1,4-dioxane, 1,3-dioxolane, dimethyl formamide and 2-methoxyethyl acetate, are effective as the second component of the solvent system. Expecially in case a composite solvent composed of acetone and 1,4-dioxane or dimethyl formamide is used, it is possible to obtain semipermeable membranes having an excellent capacity which is not possessed by products obtained by the conventional processes. From a comparison of the results shown in Table 1 with those shown in Table 2, it will readily be understood that at the same salt removal ratio, the semipermeable membrane Comparative Examples 9–14

Membranes were prepared under the same conditions as in Examples 1–4 except that various solvents were used singly, instead of the composite solvent systems used in Examples 1–4. The results of the tests of the resulting membranes are shown in Table 3.

From Table 3 it is seen that in solutions containing acetone as the sole solvent, even if the evaporation time is shortened extremely, the salt-removing capacity cannot be improved. Further, even if a solvent having a lower volatility than acetone is used as the sole solvent, the cast molding at ambient temperature does not give a semipermeable membrane having a good capacity.

TABLE 3

| Solvent | Evaporation time (second) | Heat treatment temperature (° C.) | Water permeation (m.³/m.²/day) | Salt removal ratio (percent) |
|---|---|---|---|---|
| Comparative Example: | | | | |
| 9 ____ Acetone (66.7 parts) | 8 | 72 | 0.12 | 89.7 |
| | 15 | 72 | 0.14 | 84.4 |
| | 30 | 72 | 0.14 | 85.7 |
| | 60 | 68 | 0.17 | 65.2 |
| | 15 | 68 | 0.22 | 94.5 |
| | 30 | 68 | 0.27 | 90.2 |
| 10 ____ Methylethylketone (66.7 parts) | 240 | (²) | 0.09 | (¹) |
| | 60 | (²) | 0.07 | (¹) |
| | 120 | (²) | 0.11 | (¹) |
| 11 ____ 2-ethoxyethyl acetate (66.7 parts) | 60 | (²) | 0.00 | (¹) |
| | 240 | (²) | 0.00 | (¹) |
| | 600 | (²) | 0.00 | (¹) |
| 12 ____ 1,4-dioxane (66.7 parts) | 30 | 78 | 1.03 | 58.2 |
| | 60 | 78 | 0.86 | 86.5 |
| | 120 | 76 | 0.45 | 73.4 |
| | 240 | 76 | 0.21 | 82.7 |
| | 300 | 65 | 0.54 | 86.2 |
| | 600 | 65 | 0.01 | (¹) |
| 13 ____ 1,3-dioxolane (66.7 parts) | 60 | (²) | 0.02 | (¹) |
| | 120 | (²) | 0.01 | (¹) |
| | 240 | (²) | 0.79 | 61.0 |
| | 300 | (²) | 0.32 | 63.2 |
| 14 ____ Dimethyl formamide (66.7 parts) | Gelation of the solution occurred | | | |

¹ ² See table 1, footnotes 1 and 2.

Example 5

Membranes were prepared under the same conditions as in Examples 1–4 by employing a composite solvent system of acetone and 1,4-dioxane while changing the mixing ratio as indicated in Table 4. The results of the tests made on these membranes are shown in Table 4.

From the results it will readily be understood that although the use of only acetone or 1,4-dioxane as a single solvent gives only a product having a very poor capacity, a composite solvent system comprising a mixture of both at a mixing ratio which varies over a broad range can give a semipermeable membrane having a very excellent capacity. This fact suggests that an unexpected synergistic effect is attained by the combination of acetone and 1,4-dioxane.

TABLE 4
(Results of Example 5)

| Solvent system, parts | | Evaporation time (second) | Heat treatment temperature (° C.) | Water permeation (m.³/m.²/day) | Salt removal ratio (percent) |
|---|---|---|---|---|---|
| Acetone | 1,4-dioxane | | | | |
| 66.7 | 0 | 15 | 68 | 0.27 | 90.2 |
| 66.7 | 0 | 15 | 72 | 0.24 | 94.6 |
| 61.5 | 5 | 15 | 68 | 0.78 | 95.4 |
| 61.5 | 5 | 15 | 70 | 0.57 | 96.4 |
| 56.7 | 10 | 15 | 68 | 0.80 | 96.3 |
| 51.7 | 15 | 15 | 70 | 1.28 | 96.1 |
| 51.7 | 15 | 15 | 66 | 1.45 | 95.3 |
| 46.7 | 20 | 30 | 68 | 2.08 | 91.2 |
| 46.7 | 20 | 15 | 72 | 1.36 | 95.5 |
| 31.7 | 35 | 90 | 68 | 1.26 | 94.8 |
| 16.7 | 50 | 60 | 74 | 0.99 | 95.1 |
| 0 | 66.7 | 60 | 78 | 0.86 | 86.5 |
| 0 | 66.7 | 240 | 76 | 0.21 | 82.7 |

Examples 6–14 and Comparative Examples 15–20

These examples illustrate that the effect attained by the composite solvent systems shown in Examples 1–4 is obtainable using various swelling agents which have previously been considered to give cast molding solutions which must be cast molded at low temperatures.

In these examples as the composite solvent there was used a composite solvent of acetone and 1,4-dioxane and various swelling agents as indicated in Table 5. The other conditions for the membrane preparation and the salt removal capacity measurement were the same as in Examples 1–4.

The results ase shown in Table 5. In Table 5, the use of acetone alone (comparative examples) is contrasted with the use of the composite solvent systems with respect to each of the swelling agents. As is seen from the results shown in Table 5, the improved effect attained by the use of the composite solvent system is conspicuous.

TABLE 5

| | Composition of cast molding solution (parts) | Evaporation time (second) | Heat treatment temperature (° C.) | Water permeation (m.³/m.²/day) | Salt removal ratio (percent) |
|---|---|---|---|---|---|
| Comparative Example 15. | Cellulose acetate (22.2), acetone (66.7), 30% aqueous solution of nitric acid (11.1). | 30 | (¹) | 1.083 | 32.1 |
| | | 10 | (¹) | 0.88 | 51.5 |
| | | 60 | (¹) | 0.42 | 43.3 |
| Example 6 | Cellulose acetate (22.2), acetone (46.7), 1,4-dioxane (20.0), 30% aqueous solution of nitric acid (11.1). | 15 | 65 | 1.93 | 81.8 |
| | | 15 | 70 | 1.42 | 87.8 |
| | | 30 | 65 | 1.59 | 82.0 |
| | | 30 | 70 | 1.38 | 88.1 |
| Comparitive Example 16. | Cellulose acetate (22.2), acetone (66.7), 50% aqueous solution of potassium iodide (11.1). | 10 | (¹) | 0.42 | 57.2 |
| | | 60 | 60 | 0.37 | 60.3 |
| | | 60 | 65 | 0.19 | 40.1 |
| Example 7 | Cellulose acetate (22.2), acetone (46.7), 1,4-dioxane (20.0), 50% aqueous solution of potassium iodide (11.1). | 40 | (¹) | 2.53 | 49.0 |
| | | 40 | 60 | 1.45 | 88.1 |

See footnotes at end of table.

TABLE 5—Continued

| | Composition of cast molding solution (parts) | Evaporation time (second) | Heat treatment temperature (° C.) | Water permeation (m.³/m.²/day) | Salt removal ratio (percent) |
|---|---|---|---|---|---|
| Comparative Example 17. | Cellulose acetate (22.2), acetone (66.7), water (8.1), magnesium perchlorate (1), zinc bromide (1), zinc chloride (1). | 30<br>60<br>60<br>60 | 65<br>(¹)<br>60<br>65 | 0.57<br>1.35<br>0.77<br>0.20 | 92.0<br>66.3<br>91.9<br>86.0 |
| Example 8 | Cellulose acetate (22.2), acetone (46.7), 1,4-dioxane (20.0), water (8.1), Mg(ClO₄)₂ (1), ZnBr₂ (1), ZnCl₂ (1). | 30<br>30<br>60<br>60<br>60 | 65<br>75<br>65<br>70<br>75 | 2.08<br>1.16<br>1.24<br>1.14<br>0.65 | 89.3<br>96.7<br>92.5<br>95.8<br>95.9 |
| Comparative Example 18. | Cellulose acetate (23.8), acetone (59.5), 56% aqueous solution of tartaric acid (16.7). | 15<br>15<br>30<br>30 | (¹)<br>75<br>65<br>75 | 1.36<br>0.63<br>0.78<br>0.48 | 43.0<br>92.1<br>86.6<br>92.1 |
| Example 9 | Cellulose acetate (23.8), acetone (49.5), 1,4-dioxane (10.0), 56% aqueous solution of tartaric acid (16.7). | 15<br>15<br>15<br>30<br>30 | 70<br>72<br>76<br>70<br>72 | 1.33<br>1.25<br>0.79<br>0.91<br>0.99 | 95.4<br>96.5<br>97.6<br>96.6<br>96.6 |
| Comparative Example 19. | Cellulose acetate (19.6), acetone (58.8), 27.4% aqueous solution of acetic acid (21.6). | 15<br>60<br>300 | (¹)<br>(¹)<br>(¹) | 0.44<br>0.34<br>0.34 | 50.4<br>76.0<br>92.4 |
| Example 10 | Cellulose acetate (19.6), acetone (48.8), 1,4-dioxane (10.0), 27.4% aqueous solution of acetic acid (21.6). | 60<br>60<br>60<br>90<br>90 | 65<br>60<br>70<br>65<br>60 | 1.03<br>1.19<br>0.64<br>0.87<br>1.32 | 92.7<br>86.1<br>95.0<br>93.4<br>85.0 |
| Comparative Example 20. | Cellulose acetate (18.6), acetone (55.5), 57% aqueous solution of t-butanol (25.9). | 15<br>15<br>45<br>45 | 65<br>58<br>(¹)<br>60 | 0.27<br>0.33<br>1.53<br>0.38 | 94.2<br>91.3<br>36.1<br>83.8 |
| Example 11 | Cellulose acetate (18.6), acetone (45.5), 1,4-dioxane (10.0), 57% aqueous solution of t-butanol (25.9). | 15<br>15<br>15<br>45<br>45<br>45 | 70<br>73<br>76<br>65<br>68<br>70 | 1.37<br>1.11<br>0.96<br>1.44<br>1.24<br>1.01 | 95.2<br>95.6<br>93.4<br>92.0<br>95.7<br>96.8 |
| Example 12 | Cellulose acetate (11.1), acetone (50.0), 1,4-dioxane (23.6), 10% aqueous solution of magnesium perchlorate (15.3). | 30<br>60<br>90 | 74<br>72<br>70 | 0.95<br>1.08<br>1.27 | 94.6<br>94.1<br>92.3 |
| Example 13 | Cellulose acetate (29.5), acetone (43.0), 1,4-dioxane (14.0), 10% aqueous solution of magnesium perchlorate (13.5). | 60<br>60<br>90<br>120 | 66<br>68<br>66<br>66 | 1.13<br>0.90<br>1.02<br>1.14 | 93.9<br>94.6<br>92.0<br>91.3 |
| Example 14 | Cellulose acetate (16.2), acetone (45.5), 1,4-dioxane (10.0), 66% aqueous solution of t-butanol (28.3). | 15<br>45<br>45<br>90 | 72<br>67<br>68<br>65 | 1.07<br>1.22<br>1.09<br>1.14 | 94.5<br>95.1<br>94.9<br>92.7 |

¹ See Table 1, footnote 2.

Examples 15–18 and Comparative Example 21

Various cast molding solutions composed of 22.2 parts of cellulose acetate as the membrane-forming substance, 11.1 parts of 30% aqueous solution of nitric acid and various solvent systems as indicated in Table 6 were prepared, and semipermeable membranes were formed therefrom in the same manner as in Examples 1–4, and their capacity was measured.

The results are shown in Table 6, from which it will readily be understood that the use of the composite solvent systems is very effective. Especially, in the case of a composite solvent system of acetone and dimethyl formamide, under optimum membrane-forming conditions there can be obtained a membrane having a high capacity, not possessed by products prepared according to the conventional processes.

TABLE 6

| | Solvent (parts) | Evaporation time (second) | Heat treatment temperature (° C.) | Water permeation (m.³/m.²/day) | Salt removal ratio (percent) |
|---|---|---|---|---|---|
| Comparative Example 21. | Acetone (66.7) | 30<br>30<br>10<br>10<br>10<br>60 | (¹)<br>60<br>(¹)<br>55<br>60<br>(¹) | 1.08<br>0.41<br>0.88<br>0.52<br>0.42<br>0.42 | 32.1<br>38.3<br>51.5<br>81.0<br>88.6<br>43.3 |
| Example 15 | Acetone (46.7), 1,4-dioxane (20) | 15<br>15<br>15<br>30<br>30 | 65<br>70<br>75<br>65<br>70 | 1.93<br>1.42<br>1.02<br>1.59<br>1.38 | 81.8<br>87.8<br>89.0<br>82.0<br>88.1 |
| Example 16 | Acetone (56.7), dimethyl formamide (10) | 30<br>30<br>30<br>45<br>45<br>15<br>15 | 70<br>73<br>76<br>70<br>73<br>70<br>73 | 1.55<br>1.09<br>0.75<br>1.42<br>0.91<br>2.15<br>1.21 | 90.2<br>91.9<br>93.6<br>89.6<br>91.7<br>89.1<br>94.0 |

TABLE 6—Continued

| Solvent (parts) | Evaporation time (second) | Heat treatment temperature (°C.) | Water permeation (m.³/m.²/day) | Salt removal ratio (percent) |
|---|---|---|---|---|
| Example 17.... Acetone (56.7), 2-methoxyethyl acetate (10). | 15 | 60 | 1.07 | 80.0 |
| | 15 | 55 | 1.35 | 69.3 |
| | 30 | 60 | 1.15 | 77.6 |
| | 30 | 65 | 1.01 | 85.8 |
| Example 18.... Acetone (46.7), 1,3-dioxolane (20) | 20 | 50 | 1.72 | 65.4 |
| | 45 | (¹) | 0.91 | 95.3 |

¹ See Table 1, footnote 2.

Examples 19–20 and Comparative Example 22

Cast molding solutions comprising 19.6 parts of cellulose acetate as the membrane-forming substance, 21.6 parts of 27.4% aqueous solution of acetic acid as the swelling agent and 58.8 parts of various solvent systems as indicated in Table 7 were prepared, and membranes were formed therefrom under the same conditions as in Examples 1–4. The salt-removing capacity measurement was conducted on each membrane.

The results are shown in Table 7, from which the effect by the composite solvent can clearly be understood.

Examples 21–23 and Comparative Example 23

Membranes were prepared under the same conditions as in Examples 1–4 by employing various solutions comprising 23.8 parts of cellulose acetate as the membrane-forming substance, 16.7 parts of 56% aqueous solution of tartaric acid as the swelling agent and 59.5 parts of various solvent systems as indicated in Table 8, and their salt-removing capacity was measured.

The results are shown in Table 8, from which it is seen that the improved effect by the composite solvent system is conspicuous. Especially, the use of a composite solvent

TABLE 7

| | Solvent (parts) | Evaporation time (second) | Heat treatment temperature (°C.) | Water permeation (m.³/m.²/day) | Salt removal ratio (percent) |
|---|---|---|---|---|---|
| Comparative Example 22. | Acetone (58.8) | 15 | (¹) | 0.44 | 50.4 |
| | | 60 | (¹) | 0.34 | 76.0 |
| | | 300 | (¹) | 0.34 | 92.4 |
| Example 19..... | Acetone (53.8), dimethyl formamide (5) | 30 | 70 | 1.48 | 87.8 |
| | | 30 | 73 | 1.11 | 94.0 |
| | | 30 | 76 | 0.92 | 95.5 |
| | | 60 | 70 | 1.54 | 85.1 |
| | | 60 | 74 | 0.99 | 95.9 |
| Example 20..... | Acetone (48.8), 1,4-dioxane (10) | 60 | 65 | 1.03 | 92.7 |
| | | 60 | 60 | 1.19 | 86.1 |
| | | 60 | 70 | 0.64 | 95.0 |
| | | 90 | 65 | 0.87 | 93.4 |
| | | 90 | 60 | 1.32 | 85.0 |

¹ See Table 1, footnote 2.

system of acetone and 1,4-dioxane gives a semipermeable membrane having a high capacity that cannot be obtained according to the conventional processes.

TABLE 8

| | Solvent (parts) | Evaporation time (second) | Heat treatment temperature (°C.) | Water permeation (m.³/m.²/day) | Salt removal ratio (percent) |
|---|---|---|---|---|---|
| Comparative Example 23. | Acetone (59.5) | 10 | (¹) | 1.36 | 43.0 |
| | | 10 | 75 | 0.63 | 92.1 |
| | | 30 | (¹) | 2.30 | 38.7 |
| | | 30 | 65 | 0.78 | 86.6 |
| | | 30 | 75 | 0.48 | 92.1 |
| | | 20 | 65 | 0.91 | 88.7 |
| | | 20 | 75 | 0.52 | 87.4 |
| | | 60 | (¹) | 1.02 | 65.7 |
| | | 60 | 65 | 0.09 | 77.2 |
| Example 21..... | Acetone (49.5), 1,4-dioxane (10) | 15 | 70 | 1.33 | 95.4 |
| | | 15 | 72 | 1.25 | 96.5 |
| | | 15 | 76 | 0.79 | 97.6 |
| | | 30 | 70 | 0.91 | 96.6 |
| | | 30 | 72 | 0.99 | 96.6 |
| Example 22..... | Acetone (49.5), 1,3-dioxolane (10) | 30 | 60 | 1.20 | 90.9 |
| | | 30 | 65 | 1.00 | 95.1 |
| | | 60 | 50 | 1.48 | 86.1 |
| | | 60 | 60 | 0.87 | 95.1 |
| Example 23..... | Acetone (54.5), dimethyl formamide (5) | 30 | 87 | 1.11 | 88.3 |
| | | 30 | 82 | 0.75 | 95.7 |
| | | 30 | 84 | 0.65 | 96.3 |

¹ See Table 1, footnote 2.

Example 24

A cast molding solution comprising 22.2 parts of cellulose acetate as the membrane forming substance, a composite solvent of 41.7 parts of acetone and 25 parts of 1,4-dioxane, and 11.1 parts of 10% aqueous solution of magnesium perchlorate as the swelling agent was formed into a membrane under the same conditions as in Examples 1–4, while adopting ambient temperatures of 10° C., 20° C. and 35° C. as the cast molding temperatures, following which the salt-removing capacity was measured.

The results are shown in Table 9, from which it is apparent that the membrane preparation according to this invention can be conducted at ambient temperatures within a broad range.

TABLE 9
Results of Example 24

| Casting ambient temperature (° C.) | Evaporation time (second) | Heat treatment temperature | Water permeation (m.³/m.²/day) | Salt removal ratio (percent) |
|---|---|---|---|---|
| 10 | 50 | 80 | 1.41 | 92.6 |
| 10 | 50 | 84 | 0.84 | 96.4 |
| 10 | 70 | 80 | 1.75 | 87.2 |
| 10 | 70 | 84 | 0.91 | 87.1 |
| 10 | 90 | 80 | 1.17 | 95.1 |
| 10 | 90 | 84 | 0.69 | 97.3 |
| 20 | 60 | 70 | 1.08 | 96.4 |
| 20 | 60 | 74 | 0.98 | 97.4 |
| 20 | 60 | 76 | 0.75 | 97.8 |
| 20 | 60 | 87 | 0.78 | 98.2 |
| 20 | 60 | 72 | 1.07 | 97.1 |
| 20 | 60 | 74 | 1.04 | 96.4 |
| 20 | 60 | 78 | 0.79 | 97.3 |
| 35 | 10 | 75 | 1.02 | 97.4 |
| 35 | 10 | 78 | 0.78 | 98.0 |
| 35 | 20 | 75 | 1.08 | 97.1 |
| 35 | 20 | 78 | 0.77 | 98.3 |
| 35 | 40 | 75 | 0.76 | 97.9 |
| 35 | 40 | 72 | 1.07 | 94.5 |

Comparative Example 24

Under the same conditions as in Examples 1–4, a solution composed of cellulose acetate as the membrane-forming substance, acetone as the solvent and 1,4-dioxane as the swelling agent was cast molded into a membrane, and the salt-removing capacity was tested.

The results are shown in Table 10, from which it is seen that in case 1,4-dioxane alone is used as the swelling agent, the water permeation is extremely poor in each of samples without heat treatment and 1,4-dioxane does not exhibit any swelling activity at all.

TABLE 10

| Cast molding solution composition (parts) | Evaporation time (second) | Water permeation (m.³/m.²/day) | Salt removal ratio (percent) |
|---|---|---|---|
| Cellulose acetate (25), acetone (45), 1,4-dioxane (30). | 15 | 0.01 | (¹) |
| | 30 | 0.02 | (¹) |
| | 45 | 0.01 | (¹) |
| | 60 | 0.01 | (¹) |
| Cellulose acetate (25), acetone (55), 1,4-dioxane (20). | 15 | 0.0 | (¹) |
| | 30 | 0.0 | (¹) |
| | 45 | 0.01 | (¹) |
| | 60 | 0.0 | (¹) |

¹ The measurement was impossible because the amount of water that permeated was too small.

NOTE.—In each run heat treatment was not effected.

As is seen from the above-mentioned examples and comparative examples, the process of this invention can attain unexpectedly excellent effects over the conventional processes. Further, it will readily be understood that the application range of this invention is not limited to that specifically disclosed in examples but the process of this invention can be worked within the scope specified in the claim.

The embodiments of the invention in which an exclusive property or privilege is claimed are defined as follows:

1. In a process for preparing semipermeable membranes, the steps which comprise:
    casting onto a surface, at a temperature of from about 10 to about 35° C., a thin film of a casting solution consisting essentially of:
    (A) from 11 to 30% by weight of cellulose acetate,
    (B) from 11 to 29% by weight of an aqueous solution of a swelling agent selected from the group consisting of magnesium perchlorate, tartaric acid, nitric acid, potassium iodide, acetic acid, t-butanol and a mixture consisting of magnesium perchlorate, zinc bromide and zinc chloride,
    (C) from 5 to 63% by weight of acetone, and
    (D) from 5 to 61% by weight of a material selected from the group consisting of 1,4-dioxane, 1,3-dioxolane, dimethyl formamide and 2-methoxyethyl acetate.

2. A process according to claim 1, in which C is from 16.7 to 61.5% by weight of acetone and D is from 5 to 50% by weight of 1,4-dioxane.

References Cited

UNITED STATES PATENTS

| 3,444,286 | 5/1969 | King et al. | 264—49 |
| 3,673,084 | 6/1972 | King et al. | 264—49 |
| 3,483,282 | 12/1969 | Manjikian | 264—49 |
| 3,642,773 | 2/1972 | Littman | 264—49 |

OTHER REFERENCES

Manjikian et al.: "Improvement in Fabrication Techniques for Reverse Osmosis Desalination Membranes," 1st International Symposium on Water Desalination, Wash., D.C., Oct. 3–9, 1965.

MAURICE J. WELSH, JR., Primary Examiner

U.S. Cl. X.R.

264—41